Sept. 9, 1947.  E. B. THOMPSON ET AL  2,427,312

MILKING MACHINE

Filed May 31, 1945  4 Sheets-Sheet 1

Inventors
Federick A. Gessler
Elmer B. Thompson
by Rudolph L. Lowell
atty

Sept. 9, 1947.  E. B. THOMPSON ET AL  2,427,312
MILKING MACHINE
Filed May 31, 1945  4 Sheets-Sheet 2

Inventors
Frederick A. Gessler.
Elmer B. Thompson.
by Rudolph L. Lowell att'y

Sept. 9, 1947.     E. B. THOMPSON ET AL     2,427,312
MILKING MACHINE
Filed May 31, 1945     4 Sheets-Sheet 3
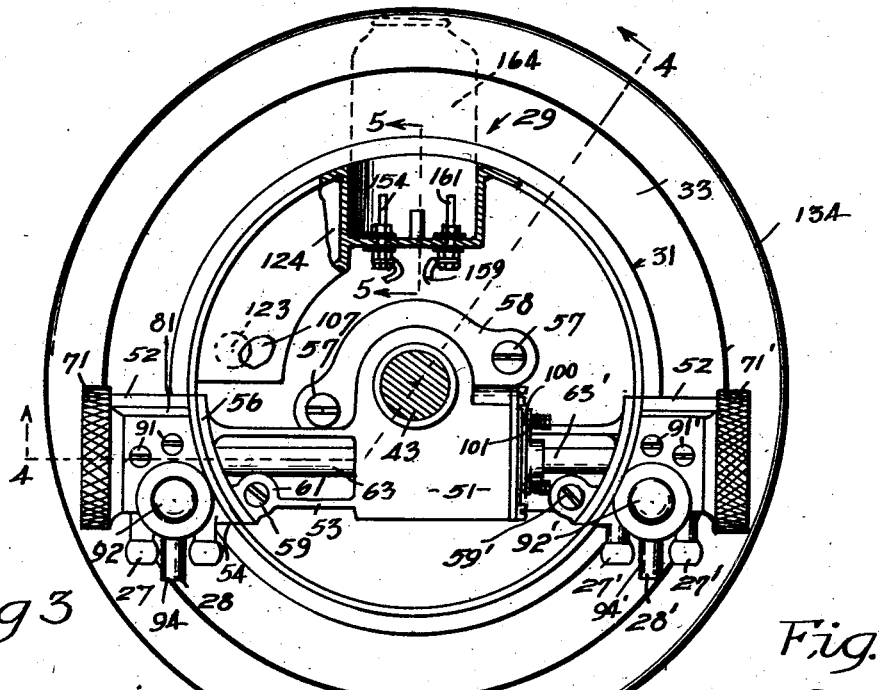
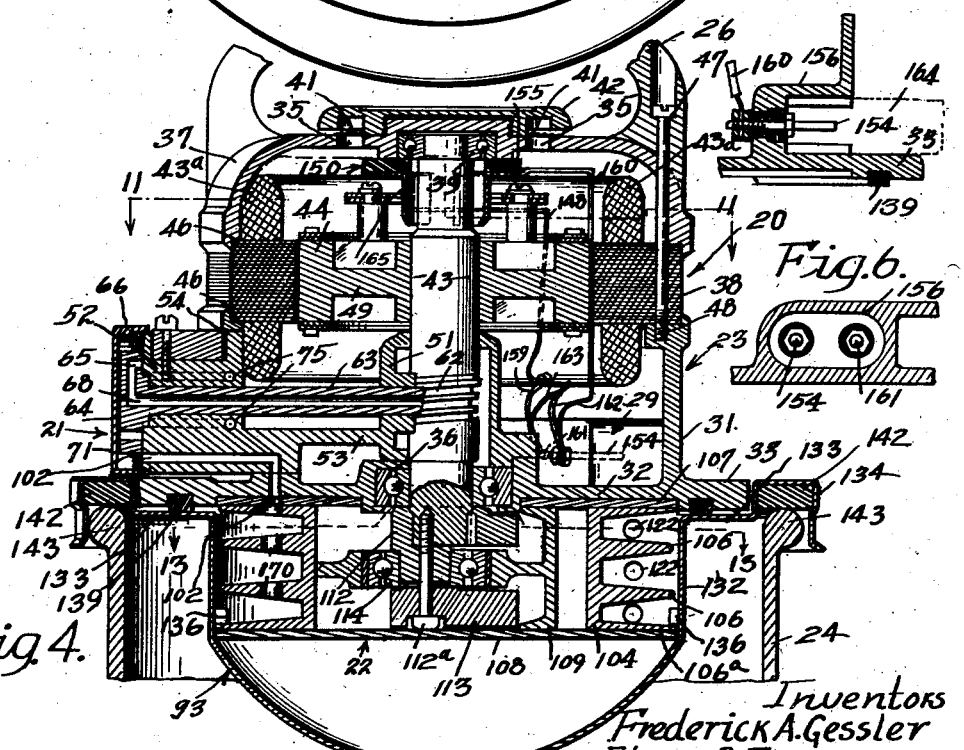

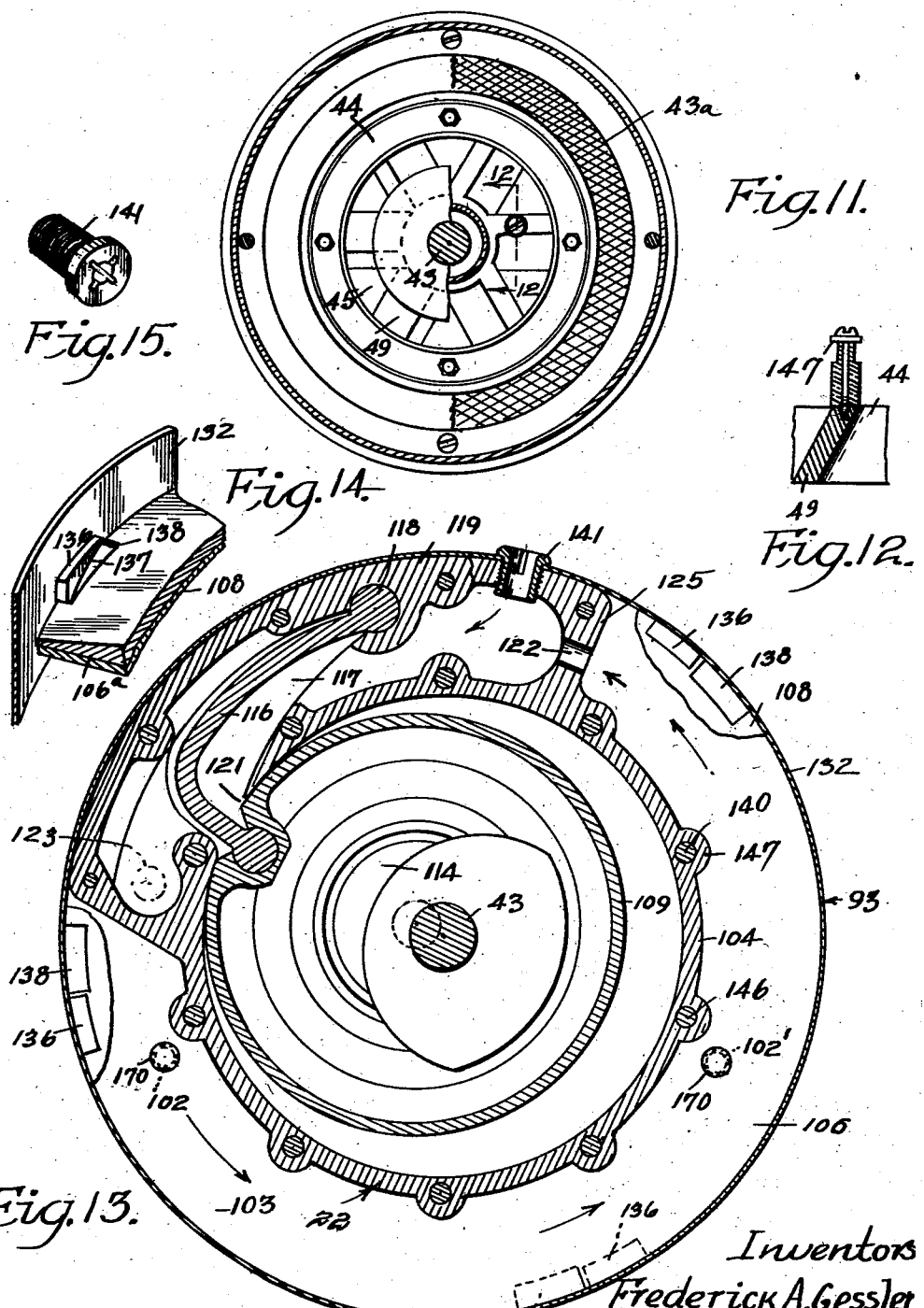

Patented Sept. 9, 1947

2,427,312

UNITED STATES PATENT OFFICE 2,427,312

MILKING MACHINE

Elmer B. Thompson and Frederick A. Gessler, Des Moines, Iowa, assignors to Globe Milker, Inc., Des Moines, Iowa, a corporation of Illinois Application May 31, 1945, Serial No. 596,864

16 Claims. (Cl. 31—62)

This invention relates generally to milking machines and in particular to a portable milking machine of pulsator type having a power unit carried on the milk receptacle.

An object of this invention is to provide an improved milking machine of portable type.

A further object of this invention is to provide a self-contained power unit adapted to be carried on a milk receptacle, having an air connection connectible with a teatcup, and including means providing for the preheating of the air supplied to the teatcup.

Still another object of this invention is to provide a power unit for a milking machine including an electrical motor, air distributing means for distributing air to a teatcup, and a suction pump, preassembled as a self-contained package and adapted to be supported on a milk receptacle, with the suction pump being located within and below the top level of the receptacle whereby to stabilize the power unit and milk receptacle assembly against tipping over.

A further object of this invention is to provide a power unit adapted to be carried on a milk receptacle, in which an electric motor and a suction pump are cooled by the air distributed to a usual teatcup of inflation type.

Another object of this invention is to provide a portable milker having a power unit, constituting a cover for a milk receptacle, which is mechanically sealed, light in weight so as to be easily handled, and capable of operating efficiently over long periods of time with a minimum of attention.

A feature of this invention is found in the provision of a power unit, constituting a cover for a milk receptacle, including a housing for a rotary suction pump and an electrical motor. The housing has therein a first air chamber at a sub-atmospheric pressure, and a second air chamber at a substantially atmospheric pressure. An air distributor within the housing is operable by the motor to alternately connect the two air chambers with an air connection on the housing adapted to be connected with a teatcup.

Yet another feature of this invention is found in the provision of a power unit for a milking machine adapted to be supported on a milk receptacle in which an air distributor, for distributing air at alternately atmospheric and sub-atmospheric pressures to a teatcup connected with the power unit, is adapted to maintain the sub-atmospheric pressure at a substantially constant value.

Further objects, features and advantages of this invention will become apparent from the following description when taken in connection with the accompanying drawings in which:

Fig. 3 is a plan view of the power unit with parts shown in section, and with the motor assembly and housing therefor removed to show an air distributing unit adapted to distribute air at alternately high and low pressures to a teatcup connected with the power unit;

Fig. 4 is a longitudinal sectional view of the complete power unit taken substantially along the lines 4—4 in Fig. 3;

Fig. 5 is a detail sectional view of a plug and socket connection taken on the line 5—5 in Fig. 4;

Fig. 6 is a transverse sectional view of the plug and socket connection shown in Fig. 5;

Fig. 11 is a sectional view as seen on the line 11—11 in Fig. 4, with parts broken away to more clearly show the construction of the armature in the motor forming part of the power unit of this invention;

Fig. 12 is a detail sectional view taken on the line 12—12 in Fig. 11;

Fig. 13 is an enlarged sectional view along the line 13—13 in Fig. 4, showing the construction of the rotary suction pump forming part of the power unit;

Fig. 14 is a fragmentary perspective view showing the pump and a housing member therefor in relative positions providing for their assembly; and Fig. 15 is a perspective view of a locking screw, shown in Fig. 13, for locking together the pump and the housing therefor.

Figure 1:
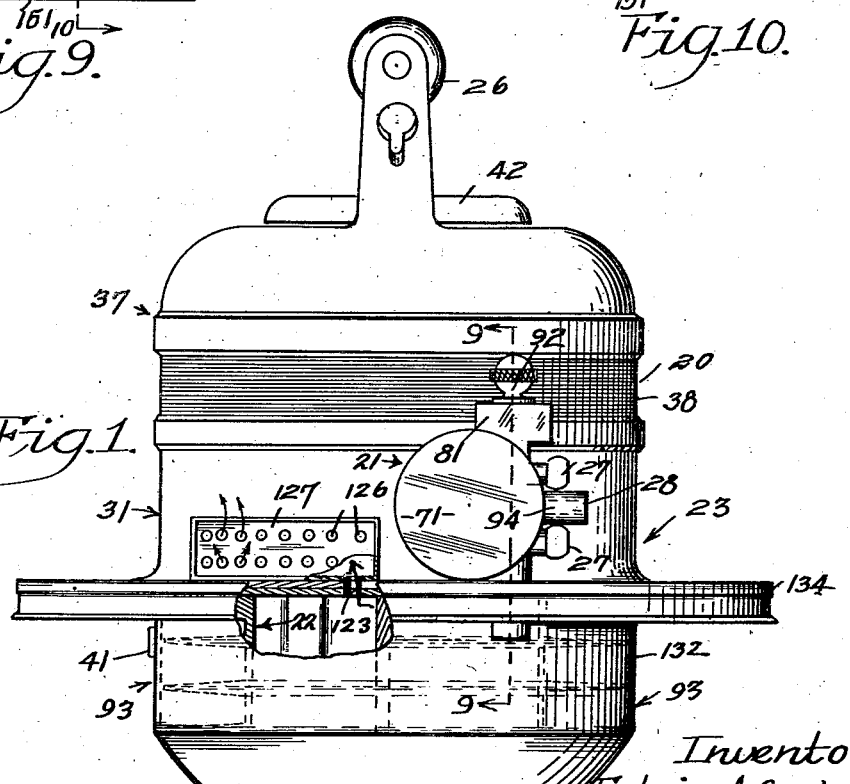
Fig. 1 is a side elevational view of the power unit of this invention with certain parts removed and other parts shown in section for the purpose of clarity.

With reference to the drawings, the power unit of this invention is shown in Figs. 1 and 4 as including an electrical motor 20, an air distributing device 21 and a rotary suction pump 22 arranged within a housing indicated generally as 23 and including the housing member 93. The power unit is adapted to rest on a milk receptacle or pail 24 and serves as a cover therefor, with the upper end of the housing 23 having a handle 26 by which the power unit may be carried about independently of the milk pail 24. The power unit is illustrated as a so-called "double unit" capable of milking two cows simultaneously and for this purpose is provided with a double set of air connections 27 and 27' and a pair of corresponding milk connections 28 and 28', respectively, connectible by suitable means with usual teatcups (not shown) of inflation type. With the power unit supported on the pail and connected with the teatcups, the milking machine is operated by connecting the motor 20 to a suitable source of electrical supply by means including a plug and socket connection 29.

Milking machines of the type including a pail supported power unit have been generally satisfactory in operation, but difficulties have been encountered in producing a power unit which is compact and light in weight, self-contained so as to be easily and readily cleaned for sanitation purposes, and capable of operating efficiently over long periods of use. Although attempts have been made to overcome these difficulties, they have not been entirely successful.

In the power unit of this invention the housing 23 is of a generally cylindrical shape and comprised of a main or intermediate housing member 31, a top housing member 37 and a bottom housing member 93. The main housing member 31 has an open top and a closed bottom wall 32 integrally formed with an annular outwardly extended flange 33 (Fig. 4). Located centrally in the bottom wall 32 is a bearing 36.

The top housing member 37, of a substantially dome shape, carries the handle 26 and has a bearing 39 at a position oppositely arranged from the bearing 36. A series of holes 35 are circularly arranged in the upper side of the housing member 37 and about the bearing 39 for admitting atmospheric air into the housing 23 for a purpose which will appear later. The openings or holes 35 are covered by a filter or screen 41, and protected against falling dirt, moisture and the like by a shield member 42 which is supported in a spaced relation above the upper side of the top housing member 37. The adjacent ends of the housing members 31 and 37 are joined together by a field core 38 for the motor 20 so that the core 38 serves as part of the housing 23.

The motor 20 is illustrated as being of split phase induction type and is located within the top housing member 37, and partially within the main housing member 31 and includes a field winding 43a carried on the field core 38. A squirrel cage type rotor 44 is mounted on an upright motor shaft 43 which is rotatably supported in the bearings 36 and 39.

The adjacent ends of the housing members 31 and 37 are formed with annular recesses or seats 46 to seat opposite sides of the field core 38 so that the outer peripheral surface of the field core is exposed between the members 31 and 37. Bolts 47 extended through the handle 26, the top housing member 37 and the field core 38 are threadable in tapped holes 48 provided in the top edge of the main housing member 31 whereby to clamp the field core 38 between the housing members 31 and 37.

The rotor or armature 44 (Figs. 4, 11 and 12) is of an open spider construction having spokes 49 angularly inclined relative to a transverse plane through the rotor to serve as vanes or impelling blades for moving air from the inlet holes 35 into the housing 23 and for circulating the air within the housing 23. Air from the inlet holes 35 is thus admitted into the housing member 37 and then moved through the spaces or air passages 45 between the spokes of the rotor 44 into the main housing member 31, so that the housing 23 constitutes a chamber for air at a substantially atmospheric pressure.

Positioned within the member 31 of the housing 23 is the air distributing unit, indicated generally as 21, which includes a body member of an irregular shape integrally formed with a gear casing 51 at one end, and a cylindrical member 52 at its opposite end (Figs. 3 and 4). The gear casing 51 and cylindrical member 52 are joined together by a connecting member 53 of a substantially U-shape in cross section having its open side faced upwardly. The cylindrical member 52 is extended outwardly from the main housing member 31 through a circular opening 54 in the wall of the housing member 31 and is provided adjacent its inner end with a flange portion 56 of a contour corresponding to the curvature of the housing member wall adjacent the opening 54. In other words, the flange portion 56 is of a shape adapted to plug or fill the opening 54 about the cylindrical member 52 to form a substantially continuous surface with the wall of the housing member 31.

The lower side of the body member of the air distributing unit 21 is supported on the upper side of the lower wall 32 of the housing member 31 and is secured thereto by bolts 57 extended through a boss portion 58 on the lower end of the gear casing 51, and by a bolt 59 extended through a boss portion 61 on the connecting member 53. The bolts 57 and 59 are threadable in tapped holes in the upper side of the lower wall 32.

The motor shaft 43 is extended through the gear casing 51 and has a portion 62 within the casing 51 provided with worm teeth. Rotatably supported within the gear casing 51 and extended through the connection member 53 for rotatable support in the cylindrical member 52 is a rotary valve 63 having an integral head member 64 located in a concentrically spaced relation within a circular cavity 66 formed in the outer end of the cylindrical member 52. The head member 64 is adapted for seating engagement against the bottom side 69 of the cavity 66, Figs. 4 and 9.

A continuous air passage 68 is extended axially through the valve member 63 and radially and then axially through the head member 64. The passage 68, therefore, has one end 67 open to the space within the housing 23 and its opposite end 65 open to the bottom side 69 of the cavity 66, which bottom side serves as a valve seat for the head member 64. The cavity 66 is closed by a cover member 71 so that the cover member 71 and the cavity 66 define an air chamber within which the head member 64 is located.

Mounted on the valve member 63 within the gear casing 51 is a worm gear 72 (Fig. 7) adapted for meshing engagement with the worm 62 on the motor shaft 43. Gear 72 is held against axial movement on the valve member 63 between bearing portions 78 integrally formed with the gear casing 51 and is keyed at 85 with the valve member 63 to provide for an axial movement of the valve member for a purpose to be later explained.

The rotary valve member 63, and the motor shaft 43 are fluid sealed with the gear casing 51 to provide for a sealed lubrication of the worm 62 and gear 72.

The cylindrical member 52 is formed with a plurality of air passages 75 (Figs. 4, 9 and 10) terminating at one end in the air connections 27 and at their opposite ends in the valve seat 69 in the cavity or air chamber 66. The ends of the air passages 75 in the valve seat 69 are angularly spaced equal distances apart in a concentric relation about the axis of the rotary valve member 63, at positions radially outwardly from such axis to provide for their successive communication with the end 65 of the air passage 68 as the valve member 63 is rotated. The passage end 65 is of an arcuate shape, and oppositely arranged therefrom and formed in the head member 64 is an arcuate slot 76 which is open to the valve seat 69 and to the air chamber 66. The arcuate end 65 of the air passage 68 and the arcuate slot 76 are of different angular lengths and provide for a predetermined timed communication of the air passages 75 with the space within the housing 23, and with the air chamber 66 for a purpose which will be later explained.

Figure 9:
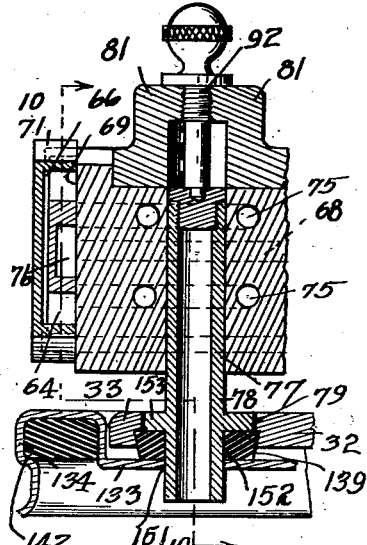
Fig. 9 is a sectional view of the air distributing device on the line 9—9 in Fig. 1.
Figure 10:
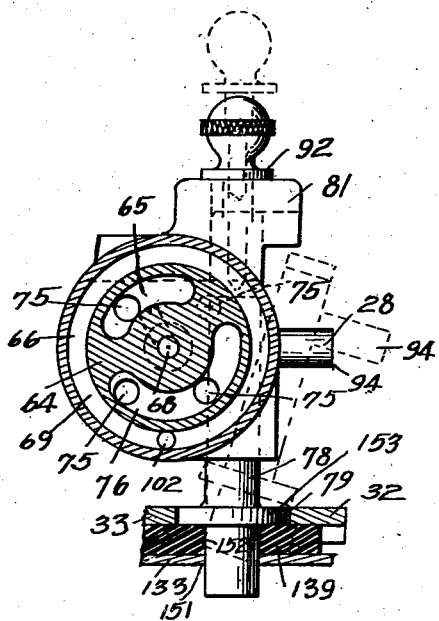
Fig. 10 is a sectional view taken on the line 10—10 in Fig. 9.
Figure 2:
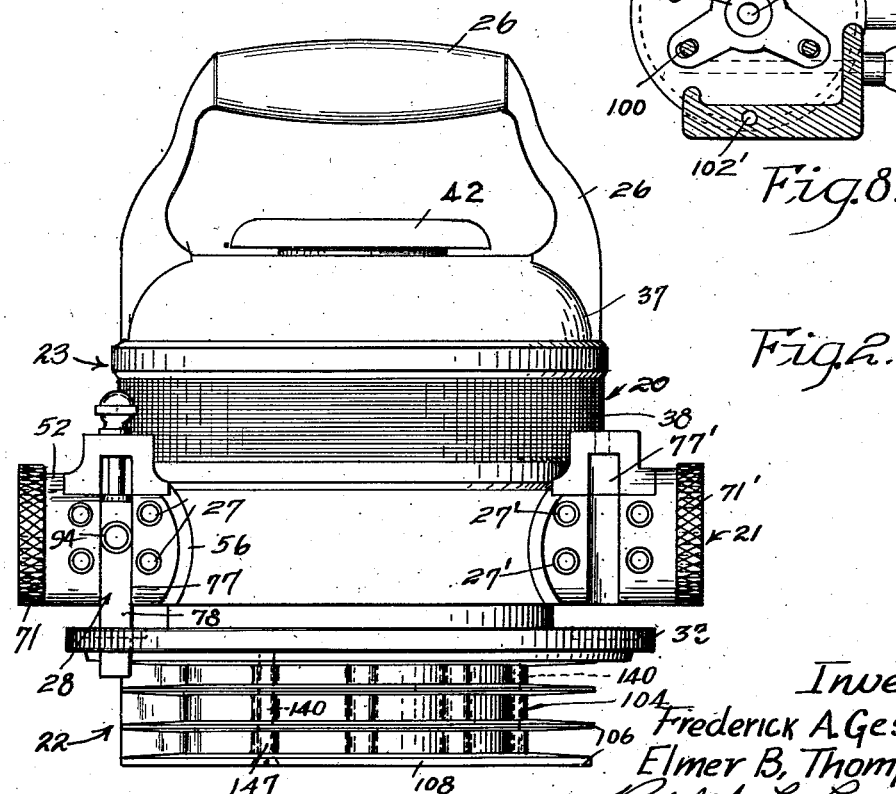
Fig. 2 is a side elevational view of the power unit looking towards the left in Fig. 1, and having certain parts removed to more clearly show its construction.

The cylindrical member 52 is also formed with an upright recess 77 located between oppositely arranged pairs of air connections 27 (Figs. 2, 9 and 10). The milk connection 28 is of a substantially inverted L-shape having its longer leg 78 receivable in the upright recess 77 and extended downwardly through an opening 79 in the bottom wall 32 of the housing member 31 for fluid communication with the milk receptacle 24. A block member 81 secured to the upper side of the cylindrical body member 52 by cap screws or the like 91 carries an adjustable screw 92 having its lower end in bearing engagement with the upper end of the leg member 68 and adjustable to clamp the milk connection 28 against the top surface of the lower housing member 93 in a manner which will be described later.

It is seen, therefore, that the milk connection 28 is detachably connected with the cylindrical member 52 and readily removable from the upright recess 77, on loosening of the adjustable screw 92, for cleaning purposes. The shorter leg 94 of the milk connection 28 is extended outwardly from the cylindrical member 52 in the same direction as the air connections 27, so that the air and milk connections on the power unit are compactly arranged over a relatively small surface on the housing 23.

Figure 7:
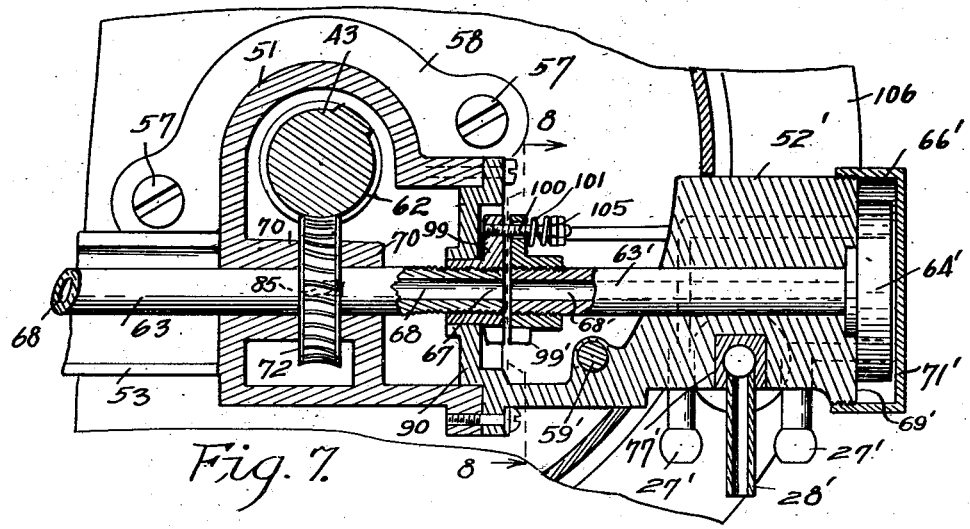
Fig. 7 is an enlarged fragmentary detail sectional view of the air distributing device shown in Fig. 3.

The air distributing unit 21 has been described thus far with respect to the four air connections 27 and the milk connection 28 adapted to provide for the milking of a single cow. To provide for the milking of two cows there is provided a cylindrical member 52', having the air connections 27' and the milk passage 28', previously mentioned, which are similar in construction and relative assembly to the cylindrical body member 52, air connections 27 and milk connection 28 (Fig. 7). The cylindrical member 52' is oppositely arranged from the cylindrical member 52 and is secured to the bottom wall 32 of the housing member 31 by screw 59'. Integral with the cylindrical member 52' is a plate member 98 forming a wall of the gear casing 51 and having the valve member 63 rotatably extended therethrough. A rotary valve member 63' is rotatably supported in the cylindrical member 52' and has a head member 64' located within an air chamber 66'. The rotary valve members 63 and 63' are in coaxial alignment and arranged with their inner ends in an axially spaced relation.

Figure 8:
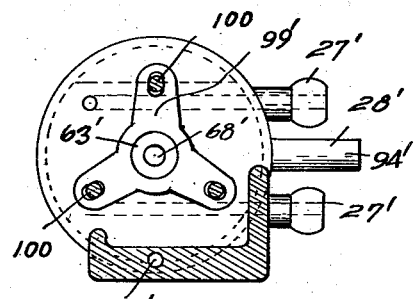
Fig. 8 is a sectional view taken on line 8—8 in Fig. 7.

Threadably supported on the inner ends of the valve members 63 and 63' are spider members 99 and 99', respectively, connected together by extended bolts 100 loosely projected through the legs or spokes of the spider 99' and threadable at one end in the legs of the spider member 99 (Figs. 7 and 8). Springs 101 are mounted about the bolts 100 and arranged in compression between nuts 105 and the spider member 99' to yieldably urge the head members 64 and 64' against their respective seats 69 and 69', and provide for a movement of the head members 64 and 64' away from their corresponding seats for a purpose which will appear later. It is thus seen that the passages 68 and 68' in the rotary valve members 63 and 63', respectively, are open to the air space within the housing 23, and the members 63 and 63' are yieldably connected together by the spider and spring assembly to provide for their concurrent rotation through the worm 62 and gear 72. Air passages 75' in the cylindrical member 52' are associated with the air connections 27' and head member 64' similar to the association of the air passages 75 with the air connections 27 and head member 64.

The air chamber 66 is connected through an air passage 102 in the cylindrical member 52, with an inlet passage 103 for the rotary suction pump 22 (Fig. 4). The air chamber 66' is similarly connected with the pump inlet passage 103 by an air passage 102' in the cylindrical member 52' (Figs. 7 and 8).

The pump 22 is of a rotary eccentric type and comprises a cylindrical casing 104 having a series of annular cooling fins 106 (Fig. 4). A top cover member 107 and a bottom cover member 108 close the casing 104. A cylindrical piston 109, positioned within the casing 104 between the cover members 107 and 108, is supported on a bearing 114 eccentric relative to the motor shaft 43. The bearing is positioned between counterweights 112 and 113, and is supported with the counterweights from the lower end of the shaft 43 by a screw 112A threadable in the shaft which is projected through a centrally located opening in the top cover 107.

The pump 22 includes a rockable baffle or partition member 115 rockably movable across an air chamber 117 integral with the pump casing 104 (Fig. 13), to control the admission to and discharge of air from the pump. One end of the rockable member 116 is in a ball and socket connection with the outer wall 119 of the air chamber 117, while its opposite end is extended through an opening 121 in the casing 104 and in a ball and socket connection with the piston 109. The chamber 117 to the right of the rockable member 116, as viewed in Fig. 13, is in fluid communication through openings 122 in the chamber wall 125 with the pump inlet passage 103, while that portion of the chamber 117 to the left of the rockable member 116, as also viewed in Fig. 13, is connected through openings 123 in the top cover member 107, and in the bottom wall 32 of the housing member 31 with a pump outlet 124 formed in the housing 31 (Figs. 1 and 3). The pump outlet 124 is open to the atmosphere through holes 126 formed in a cover member 127 for the outlet 124. The entrance of the air passages 102 and 102' into the intake passage 103 of the pump 22 are indicated in dotted lines in Fig. 13, with the travel of the air from the passages 102 and 102' into the intake passage and intake side of the chamber 117 being indicated by arrows in Fig. 13; and the travel of the air from the outlet side of the chamber 117 and through the openings 123 and outlet 124 to the atmosphere being indicated by arrows in Fig. 1.

The bottom housing member 93 is of a substantially inverted dome shape (Fig. 4) having a spherical lower end 131, a straight side wall 132 adapted to fit in contact engagement with the outer extremities of the fins 106 and forming an outer wall for the passage 103, and a laterally extended flange or top portion 133 formed with a marginal rim 134 of a substantially inverted U-shape. Adjacent the junction of the spherical portion 131 and the straight side wall 132 the housing member 93 is provided on its inner periphery with a series of angularly spaced inwardly projected lugs or extensions 136 (Figs. 13 and 14) having their lower sides 137 inclined upwardly in one direction. The lowermost fin on the casing 104, indicated as 106a in Figs. 4 and 14, is formed on its peripheral edge with a series of recesses or openings 138 arranged in an angularly spaced relation corresponding to the spaced relation of the lugs 136, and adapted to receive the lugs 136 therethrough. With the housing member 93 positioned over the pump 22 and the lugs 136 in alignment with the recesses 138, the lugs are movable upwardly through the recesses 138, as is clearly illustrated in Fig. 14, so that they are located above the top side of the lowermost fin 106A. On rotation of the housing 93 in one direction relative to the pump 22, the lower sides 137 of the lugs 136 serve as cams adapted for riding engagement on the top side of the lowermost fin 106a to support the housing 93 on the casing 104.

Concurrently with the support of the lugs 136 on the fin 106a the lateral flange portion 133 of the housing 93 is moved upwardly by the cam action of the lugs 136, into sealing engagement with an annular gasket 139 positioned in the lower side of the wall 32 of the housing member 31 in a concentrically spaced relation about the casing 104. It is thus seen that the housing member 93 is fluid sealed at the gasket 139 with the housing member 31 concurrently with its assembly with the pump casing 104, and forms in conjunction with the casing 104 the air inlet passage 103 for the pump 22 within which the cooling fins 106 are extended.

The housing member 93 is locked against rotation out of its supported position on the casing 104 by the provision of a tubular screw 141 (Figs. 13 and 15) which is threadable within tapped aligned openings formed in the outer wall 119 of the chamber 117 to the intake side of the rockable member 116. The screw 141 also fluid connects the chamber 117 with the milk pail 24 for a purpose to appear later.

Arranged within the substantially U-shaped peripheral edge 134 of the housing member 93 is a resilient gasket 142 adapted to rest on the top peripheral rim 143 of the milk pail 24 to air seal the milk pail when the power unit is supported thereon, so that the member 93 constitutes a cover for the milk pail.

In the assembly of the power unit of this invention, the air distributing unit 21 is initially assembled within the main housing member 31. It is apparent, of course, that the air connections 27 and 27', and milk connections 28 and 28' are initially removed from the cylindrical members 52 and 52' so that these can be extended through the wall of the housing member 31. The motor shaft 43, with the rotor 44 attached thereto, is then extended through the gear casing 51 and outwardly from the bottom wall 32 of the housing member 31. The motor field 38 and housing member 37 are then relatively positioned and connected with the housing member 31 by the bolts 47. On completion of this assembly the pump piston 109 is connected with the bearing 114 and counterweights 112 and 113 to the lower end of the shaft 43 after which the pump casing 104 and lower cover member 108 are arranged in their relative assembly positions and secured to the underside of the wall 32 of the housing member 31 by screws 140, shown in Fig. 2, extended through a series of openings 146, shown in Fig. 13, formed in boss portions 147 angularly spaced about the outer periphery of the casing 104. The housing member 93 is then assembled about the casing 104 in the manner above described.

With the bottom housing member 93 assembled with the pump casing 104, the air connections 27 and 27' are inserted within the outer ends of the air passages 75 and 75' in the cylindrical members 52 and 52', respectively, and the block members 81 and 81' providing for the detachable assembly of the milk connections 28 and 28' are secured to their corresponding cylindrical members 52 and 52'.

The milk connection 28 (Figs. 9 and 10) is assembled in the power unit by positioning its longer leg 78 within the recess 77 with its lower end projected through aligned openings 79, 151 and 152 formed, respectively, in the wall member 32 in the lateral portion 133 of the housing member 93, and in an enlarged section of the gasket 139. A collar 153, spaced from the lower end of the leg 78, is receivable in the opening 79 for bearing engagement against the top side of the gasket 139. On tightening of the adjustable screw 92, therefore, the gasket 139 is clamped between the collar 153 and the flange portion 133 to provide for the connection 28 being firmly held between the screw 92 and the flange portion 133. Further, the clamping action on the gasket 139 fluid seals the milk connection 28 with the portion 32 of the housing member 31 and the flange portion 133.

To complete the assembly of the power unit, a gasket 142 is inserted within the peripheral U-shape rim 134 of the bottom housing member 93. When the power unit is placed on the pail 24, the lower side of the gasket 142 rests on the top peripheral rim 143 of the pail 24 and is urged into a fluid sealing engagement with the rim by the weight of the power unit. By virtue of the relative assembly of the pump 22 and housing member 93 with the housing member 31, it is seen that the pump 22 is located within the pail 24 substantially below the level of the pail rim 143. The overall height of the pail and power unit assembly is thus appreciably reduced to in turn lower the center of gravity of such assembly, whereby to increase the stabilization of the assembly against being tipped over.

In the operation of the power unit there is provided, for motor starting purposes, a centrifugal switch, indicated generally at 150 (Fig. 4) including a terminal 155 connected by a conductor 160 with a main terminal 154 suitably carried in a socket 156 formed in the housing member 31 adjacent its bottom wall 32 and forming a part of the plug and socket connection 29. A second terminal 165, in the switch 150, is connected by a conductor 148 with a starting winding (not shown) forming a part of the motor field winding 43a, with a conductor 159 connecting the starting winding with a second main terminal 161 carried in the socket 156 adjacent to the first main terminal 154. The field winding 43a is connected with the main terminals 154 and 161 by conductors 162 and 163, respectively. The main terminals 154 and 161 are detachably connected in a usual manner with a plug 164 carried on and forming part of a usual extension wire adapted for connection with a source of electrical supply. The switch 150 operates in a well known manner to break the circuit of the starting winding after the motor 20 has reached a predetermined speed of rotation.

During the operation of the power unit, atmospheric air is admitted into the housing 23 through the inlet holes 35 and moved downwardly by the vanes 49 of the motor rotor 44 into that portion of the housing 23 located between the motor 20 and the bottom wall 32 of the housing member 31. It is apparent, also, that the vanes act to circulate the air within the housing members 31 and 37. Movement of the air through the inlet holes 35 and rotor 44 is also effected by the action of the pump 22 which functions to exhaust air from the milk pail 24 through the tubular locking member 141, and from the air chambers 66 and 66' through the passages 102 and 102'. It is seen, therefore, that the air within the housing 23 is at a substantially atmospheric pressure, while the air within the chambers 66 and 66' is at a sub-atmospheric pressure created by the pump 22.

On rotation of the rotary valve members 63 and 63', the air connections 27 and 27' are alternately connected in succession with the air chambers 66 and 66', respectively, and with the atmospheric air within the housing 23, whereby to distribute air at alternately high and low pressures to the teatcups which are connected with the air connections 27 and 27'. Since air is continuously exhausted from the milk pail 24, a sub-atmospheric pressure is also produced in the milk connections 28 and 28', and in turn in the milk passages (not shown) which are connected between the connections 28 and 28' and their respective teatcups. It is thus apparent that for predetermined intervals of time the space within the housing 23 is connected with the pump inlet passage 103 through the air distributing unit 21 and air passages 102 and 102'. Air from the passages 102 and 102' is distributed throughout the inlet passage 103 by the provision of openings 170 (Figs. 4 and 13) in the vanes 106. The suction action of the pump 22 thus supplements the action of the rotor 44 in moving air at a substantially atmospheric pressure from the housing inlet 35 through the motor 20, into the distributing unit 21 and the teatcups connected with the power unit, and then into the air intake passage 103.

The pressure of the air in the chambers 66 and 66' is maintained against increasing above a predetermined pressure by virtue of the yieldable connection of the inner adjacent ends of the valve members 63 and 63' through the spiders 99 and 99', bolts 100 and springs 101. Thus should the pressure in the chamber 66', for example, be reduced below a pressure as determined by the pressure of the springs 101, the head member 64' will be moved away from its corresponding seat 69', or to the right as viewed in Fig. 7, against the action of the springs 101, whereby to admit atmospheric air from the passage 68' directly into the chamber 66'. A similar movement of the head member 64, relative to its seat 69, will take place in the event the pressure of the air in the chamber 66 is reduced below a pressure as determined by the springs 101.

As indicated in dotted lines in Fig. 13, the air exhausted from the air chambers 66 and 66' into the air passages 102 and 102', respectively, is taken into the pump inlet passage 103 at positions angularly spaced from the inlet holes 122 leading into the pump intake side of the air chamber 117. The air distributed to the teatcups thus initially acts to cool the motor 20 by its passage through the rotor 44 and after leaving the teatcups acts further to cool the pump by virtue of its directed travel through the air passage 103 about an appreciable portion of the periphery of the pump casing 104. The motor 20 is further cooled by radiation due to the field winding 38 being exposed to the atmosphere between the adjacent ends of the housing members 31 and 37.

It is apparent, of course, that the atmospheric air passing through the motor 20 and circulated in the housing 23 is heated by the motor. As a result, the air distributed by the distributing unit 21 to the teatcup is preheated. As is well known, cows are rather sensitive to the application on their teats of cold hands or cold teatcups, and where they are unduly irritated fail to produce a desired milking, or, as is commonly referred to, fail to "let their milk down." In the use of mechanical milkers, it is desirable that the milking operation simulate as closely as possible the feeding action of a calf. Generally, however, an unnatural feeling to the cow is produced by the positioning of the cold teatcups on the teats and then distributing relatively cold air to the teatcups during the milking operation.

By virtue of the air in the housing 23 being preheated by the motor 20, prior to its distribution to the teatcup, the teatcup is prevented from becoming cold and provides a relatively warm pleasant feeling to the cow. This simulation of a natural milking of the cow aids the normal mechanical efficiency of the milking machine to produce an overall quick and complete milking operation. In other words, control of the milk in a milking operation is essentially with the cow so that when the milking action takes place in a pleasant and natural manner for the cow, the better are the milking results attained.

To further simulate a natural milking action, the rotary valve members 63 and 63' are adapted to operate their respective teatcups in succession, that is, one teatcup at a time and in a sequential order. This manner of operating the teatcups is believed to be more pleasing to a cow than a simultaneous operation of all of the teatcups.

From a consideration of the above description, it is seen that the invention provides a power unit for a milking machine which is of a compact and simple design, self-contained within a housing means having a peripheral surface which can be easily washed and kept clean. As a further aid to cleanliness and sanitation, the dome shape portion 31 of the bottom housing member 93 prevents the power unit from being set in an upright position on a floor surface and thus discourages the machine operator from such action. Also, the power unit is assembled as a self-contained mechanically sealed unit. In other words, access to the motor 20 and air distributing unit 21 can be had only on removal of the bolts 47 which are substantially concealed within the housing 23 and in the handle 26. The head portions of the bolts 47 may be covered with a suitable filling material, which on being painted over effectively hides the bolts 47 so as to discourage any tampering with the power unit. Likewise, the assembly of the lower housing member 93 about the pump 22 reduces tampering with the pump, since the function of the air inlet 141 to lock the housing 93 with the casing 104 is not readily apparent.

Although the power unit is mechanically sealed, all of its operating parts are efficiently cooled by the utilization of the air distributed to the teatcups for cooling the motor 20 and the pump 22. Since the air passed through the motor 20 for cooling purposes is heated by the motor, warm or preheated air is distributed to the teatcups at all times, and from the teatcups is passed about an appreciable portion of the periphery of the pump 22 to serve as a cooling agent for the pump. It is readily appreciated, of course, that the air thus admitted to the pump 22 for cooling purposes provides for a relatively high cooling efficiency of the pump by virtue of the air being cooled in its travel to and from the teatcups.

The complete power unit is relatively light in weight and in one embodiment of the invention has an overall weight of about eighteen pounds. The unit, therefore, is easily handled by women and boys so that the milking chore is not restricted to the men members of a family. Further, the assembly of the pump from the underside of the wall 32 of the housing member 31, in conjunction with the support of the power unit on the pail rim 143 in substantially the plane of the lower wall member 32, provides for the location of the pump 22 substantially below the level of the pail rim 143. This location of the pump 22 within the pail lowers the center of gravity of the power unit and milk pail assembly to stabilize such assembly against tipping movement.

Although the invention has been described with respect to a preferred embodiment thereof, it is to be understood that it is not to be so limited since changes and modifications can be made therein which are within the full intended scope of this invention as defined by the appended claims.

We claim:

1. In a milking machine including a milk receptacle, a power unit constituting a cover for said receptacle and including a milk connection and an air connection adapted to be connected with a teatcup, milk passage means connecting said milk receptacle with said milk connection, a pair of air chamber in said power unit, a suction pump having an inlet portion fluid connected with one of said air chambers and with said receptacle to provide for a sub-atmospheric pressure in said one chamber, in said receptacle and in said milk connection, means for introducing air at a substantially atmospheric pressure into the other one of said air chambers, an air distributing device for alternately fluid connecing said pair of chambers with said air connection, and an electrical motor for operating said pump and said air distributing device.

2. In a milking machine including a milk receptacle, a power unit for covering said receptacle including a housing having a milk connection and an air connection adapted to be connected with a teatcup, passage means fluid connecting said milk connection with said receptacle, a pair of air chambers in said housing, a suction pump carried on said housing having an inlet portion fluid connected with one of said air chambers and with said milk receptacle to provide for a sub-atmospheric pressure in said one air chamber and in said receptacle and milk passage means, an air distributing device for fluid connecting said pair of chambers in succession with said air connection, an electrical motor in said housing for operating said air distributing device and pump, air passage means in said motor, and means for introducing atmospheric air into said housing for travel through said air passage means into the second one of said pair of air chambers.

3. In a milking machine having a milk receptacle, a power unit constituting a cover for said milk receptacle including a housing having a milk connection and an air connection adapted to be connected with a teatcup, a milk passage means in said housing connecting said receptacle with said milk connection, a first air chamber means in said housing having a sub-atmospheric pressure therein, a second air chamber means in said housing having a substantially atmospheric pressure therein, means for fluid connecting said two air chambers in succession with said air connection, a suction pump having an inlet portion constituting an air cooling passage for said pump, with said inlet portion being fluid connected with said receptacle and with said milk passage means, an electric motor for operating said pump and said fluid connecting means, an atmospheric air inlet for said housing, and air cooling passage means in said motor open at one end to said housing air inlet and at an opposite end to said second air chamber.

4. In a milking machine, a power unit including a housing having an air connection adapted to be connected with a teatcup, a first air chamber in said housing having a sub-atmospheric pressure therein, a second air chamber at a substantially atmospheric pressure, a suction pump for exhausting air from said first air chamber, an air distributing means for alternately fluid connecting said two air chambers with said air connection, an electric motor for operating said pump and said air distributing means, means for admitting atmospheric air into said second air chamber, and means for preheating the air admitted to said second air chamber.

5. In a milking machine, a power unit including in combination a housing, an electric motor in said housing having an air passage therein, a first air chamber in said housing having a sub-atmospheric pressure therein, a second air chamber in said housing at a substantially atmospheric pressure, an air connection on said housing adapted to be connected with a teatcup, and an air distributing means in said housing for alternately fluid connecting said two air chambers with said air connection, a suction pump connected with said first air chamber, and an atmospheric air inlet in said housing fluid connected with one end of said air passage, with the opposite end of said air passage being open to said second air chamber, said atmospheric air, on passing through said air passage, acting to cool said motor and being heated thereby prior to its flow into said second air chamber.

6. In a milking machine having a milk receptacle, a power unit comprising a cover for said receptacle and including a housing, an electrical motor supported within and adjacent to the upper end of said housing, a vertical shaft for said motor rotatably supported in the opposite ends of said housing, a rotary air distributing means located in said housing below said electrical motor, means connecting said distributing means in a driven relation with said shaft, an air chamber in said housing having a sub-atmospheric pressure therein, said air distributing means having therein a first air passage with one end open to a substantially atmospheric air pressure, and a second air passage with one end open to said air chamber, an air connection and a milk connection on said housing adapted to be connected with a teatcup, with the opposite ends of said two passages being arranged so that on rotation of said distributing means said opposite ends are successively fluid connected with said air connection, a milk passage means in said housing connected at one end with said milk connection and having its other end open to said milk receptacle, a suction pump supported from the bottom end of said housing, means connecting said pump with said shaft, and an inlet passage for said pump, fluid connected with said receptacle and with said air chamber.

7. In a milking machine, a power unit having an air connection adapted to be connected with a teatcup, an air chamber having a sub-atmospheric pressure therein, a rotary air distributing means having therein a first air passage open at one end to air at a substantially atmospheric pressure, and a second air passage open at one end to said air chamber, with the opposite ends of said two passages being arranged so that on rotation of said air distributing means, said opposite ends are fluid connected in succession with said air connection, a suction pump having an air passage extended about a portion thereof, heat conducting and radiating members on said pump projected within said pump air passage, air passage means connecting said air chamber with one end of said pump air passage, and an inlet for said pump open to the other end of said pump air passage, with the air passing through said pump passage acting to cool said pump, and an electric motor for operating said pump and said air distributing means.

8. In a milking machine having a milk receptacle, a power unit constituting a cover for said receptacle and including a housing having an atmospheric air inlet, an air connection and a milk connection on said housing adapted to be connected with a teatcup, an electric motor in said housing adjacent said inlet having a rotor of a construction adapted to move air through said inlet and into said housing, with the air moved by said rotor acting to cool said motor, an air chamber in said housing having a sub-atmospheric pressure therein, an air distributing device in said housing for alternately distributing air from within said housing and said air chamber to said air connection, means for driving said air distributing device from said motor, a milk passage means connecting said milk connection with said receptacle, and a suction pump driven by said motor having an air inlet, fluid connected with said air chamber and with said receptacle.

9. In a milking machine having a milk receptacle, a power unit constituting a cover for said receptacle comprising a housing, an electric motor supported within and adjacent to the upper end of said housing having a vertically arranged shaft, means rotatably supporting said shaft in said housing, an air inlet in said housing concentrically positioned about the upper end of said shaft, a squirrel cage rotor for said motor having spokes of a construction to move air through said inlet into said housing, with said air acting to cool said motor and being heated thereby, an air chamber in said housing having a sub-atmospheric pressure therein, a milk connection and an air connection on said housing adapted to be connected with a teat cup, an air distributing device including a rotatable passaged member for alternately distributing air from said housing and said air chamber to said air connection, means connecting said shaft with said rotatable member, a milk passage means connecting said milk connection with said receptacle, a rotary suction pump driven from said shaft, supported at the bottom end of said housing and positioned within said receptacle, an air passage means arranged about a portion of the periphery of said pump, an inlet for said pump open to one end of said air passage means, and means fluid connecting the other end of said passage means with said air chamber and with said receptacle, with the air flowing through said air passage means acting to cool said pump.

10. In a milking machine having a milk receptacle, a power unit constituting a cover for said receptacle including a housing of a substantially cylindrical shape, a suction pump arranged at the bottom of said housing having a casing of a substantially cylindrical shape, an annular outwardly extended flange on said casing having a series of angularly spaced recesses in its periphery, an annular gasket member on the housing arranged in a spaced relation about the upper end of said pump casing, a portion of said housing constituting an enclosure for said pump casing having an open top and an annular flange extended radially outwardly from its upper end, and a series of angularly spaced projections on the inner periphery of said enclosure having longitudinally sloped bottom sides, said projections, when the pump is positioned within said enclosure, being movable through said recesses and adapted, on rotational movement of said enclosure relative to said pump, to engage the top side of said pump casing flange whereby to move the flange at the upper end of said enclosure against said gasket member, with the peripherial edge portion of said last mentioned flange being adapted to rest on the top rim of said receptacle so that the pump is located within said receptacle.

11. In a milking machine, a power unit including a housing having an air connection adapted to be connected with a teatcup, an air chamber in said housing having a sub-atmospheric pressure therein, means for introducing air at a substantially atmospheric pressure into said housing, an air distributing device for alternately distributing air from said housing and said air chamber to said air connection including a stationary member having a valve seat constituting a wall for said air chamber, with said stationary member having an air passage therein connected at one end with said air connection and having its other end terminating in said valve seat, a rotary valve member having a head portion located in said air chamber and adapted for seating engagement with said valve seat, and a stem portion rotatably supported in said stationary member, means for yieldably urging said stem portion in one direction to hold said valve seat and head portion in seating engagement, said stem portion and said head portion having a continuous air passage therein open at one end to the space in said housing and open at its opposite end to said valve seat, and said head portion having an air passage therein open to said air chamber and to said valve seat, with said other end of the stationary member air passage being positioned on said valve seat so as to be successively aligned with the two air passages in said rotary valve member on rotation thereof, and a suction pump for exhausting air from said air chamber, said head portion being movable away from said valve seat in response to the action thereon of a sub-atmospheric pressure in said air chamber greater than the pressure applied on said head portion by said yieldable means, whereby to communicate said air chamber with the atmospheric air in said housing through said continuous air passage to increase the air pressure in said air chamber.

12. In a milking machine, a power unit including a housing having an air connection adapted to be connected with a teatcup, a first air chamber in said housing having a sub-atmospheric pressure therein, a second air chamber at a substantially atmospheric pressure, a pump for exhausting air from said first chamber, an air distributing means for alternately fluid connecting said two chambers with said air connection, an electric motor for operating said pump and said air distributing means, with said pump, said air distributing means and said motor being arranged in substantially superposed positions within said housing, and means for admitting atmospheric air into said second chamber.

13. In a milking machine having a milk receptacle, a self-contained power unit constituting a cover for said milk receptacle including a housing having an air passage therein adapted to be connected with a teatcup, a motor having an upright shaft, means, including a pump, for alternately supplying air at high and low pressures to said air passage, and means connecting said air supply means in a driven relation with said shaft, with said motor and air supply means being arranged in a superposed relation within said housing.

14. In a milking machine having a milk-receiving receptacle, a self-contained power unit adapted to cover said receptacle to close the same, including an air passage and a milk passage adapted to be connected with a teatcup, a motor, means for alternately distributing air at high and low pressures to said air passage, means for evacuating air from said milk passage and receptacle, an upright cylindrical housing for said motor, air distributing means and air evacuating means, and means in said housing for connecting said air distributing means and air evacuating means for operation by said motor, with said air evacuating means being arranged within the lower end portion of said housing.

15. A self-contained power unit for a milking machine having a milk receptacle, said unit constituting a cover for said receptacle and having an air passage and a milk passage therein adapted for connection with a teatcup, means for evacuating air from said milk receptacle and milk passage, means for alternately distributing air at high and low pressures to said air passage, a motor for operating said air evacuating and air distributing means, a housing, with said motor, air evacuating and air distributing means being arranged within said housing, power shafts for said motor and air evacuating means and means on said housing for supporting the power unit on said receptacle in a fluid sealed relation therewith, said motor and air evacuating means having their power shafts in upright positions when the cover is on said receptacle.

16. A self-contained power unit for a milking machine having a receptacle, including an air passage and a milk passage adapted for connection with a teatcup, a pump unit for evacuating air from said receptacle and milk passage, a unit for alternately distributing air at high and low pressures to said air passage, a motor unit for operating said pump and air distributing units, an upright substantially cylindrically shaped housing for enclosing said motor, pump and air distributing units, and means on said housing for supporting the power unit on said receptacle, with said housing being arranged substantially centrally of said supporting means.

ELMER B. THOMPSON.
FREDERICK A. GESSLER.

REFERENCES CITED

The following references are of record in the file of this patent:

UNITED STATES PATENTS

| Number | Name | Date |
|---|---|---|
| 1,810,477 | Hinman | June 16, 1931 |
| 1,472,467 | Gessler | Oct. 30, 1923 |

FOREIGN PATENTS

| Number | Country | Date |
|---|---|---|
| 748,593 | France | Jan. 7, 1933 |